United States Patent [19]

Iwawaki et al.

[11] 3,733,443

[45] May 15, 1973

[54] SPEED CONTROL SYSTEM WITH CONTROL SIGNALS ON ONE TAPE USED TO CONTROL SPEED OF SECOND ENDLESS TAPE

[75] Inventors: Yasutaka Iwawaki, Ohta-ku, Tokyo; Minoru Yoshikawa, Kawasaki-shi, Kanagawa; Yukio Usui, Asahi-ku, Yokohama-shi, Kanagawa-ken, all of Japan

[73] Assignee: Canon Kabushiki Kaisha, Tokyo, Japan

[22] Filed: May 5, 1971

[21] Appl. No.: 140,355

[30] Foreign Application Priority Data

May 8, 1970 Japan ................................45/39423

[52] U.S. Cl. ..................179/100.2 S, 179/100.2 MD

[51] Int. Cl. ..............................................G11b 15/52

[58] Field of Search .............179/100.2 S, 100.2 MD; 35/35 C

[56] References Cited

UNITED STATES PATENTS

| | | | |
|---|---|---|---|
| 3,059,348 | 10/1962 | Mezzacappa | 35/35 C |
| 3,389,231 | 6/1968 | Brundage | 179/100.2 S |
| 2,709,204 | 5/1955 | Holmes | 179/100.2 S |

*Primary Examiner*—Bernard Konick
*Assistant Examiner*—Robert S. Tupper
*Attorney*—Ward, McElhannon, Brooks & Fitzpatrick

[57] ABSTRACT

The audio signals are recorded on the two tracks of the tape in phase and the control signals for automatically stopping the main tape and for varying the tapespeed of the endless tape are recorded on the respective tracks so as to be out of phase by 180°, so that the audio signals and the control signals may be derived independently as the summation and difference signals. Therefore the recording capacity of a magnetic tape may be much improved and the speed of the endless or auxiliary tape may be varied in response to the control signals.

9 Claims, 8 Drawing Figures

SPEED CONTROL SYSTEM WITH CONTROL SIGNALS ON ONE TAPE USED TO CONTROL SPEED OF SECOND ENDLESS TAPE

BACKGROUND OF THE INVENTION

The present invention relates to a magnetic recording and reproducing apparatus and more particularly a device for use with a magnetic recording and reproducing apparatus for automatically controlling the speed of magnetic recording medium.

There has been known a device for use with the conventional magnetic recording and reproducing apparatus in which a track is provided on the magnetic recording medium such as a magnetic tape or magnetic disk so that the speed control signals consisting of pulses of constant period and phase or the speed control signals of predetermined frequencies are recorded on the track and the control signals are detected when the magnetic recording medium is transported so as to vary the transport speed of the magnetic recording medium. However this system must provide an additional track for recording the control signals in addition to the tracks used for recording the information so that the recording capacity or density is inevitably reduced. In case of a magnetic tape used for recording the audio signals, it is impossible to provide this additional track.

To overcome this problem, there has been proposed a system in which the control signals are recorded on the tracks for recording the information. In this case, the control signals must be modulated so that it will not interfere with the information signals, and when the information to be recorded are audio signals, the control signals must be so selected as to have a frequency less than for example 20 Hz which is not audible. This system, therefore, has the distinctive defect that the system becomes very complex because the modulators, filters, discriminators to descriminate the control signals from the audio signals must be incorporated.

The same applicant has proposed the new and improved magnetic recording and reproducing apparatus in the application Ser. No. 87,499, filed on Nov. 6, 1970, entitled "MAGNETIC RECORDING-REPRODUCING DEVICE" by Shozo Moriya, Electrical Engineer, at 480, Manpukuji, Kawasaki-shi, Kanagawa-ken Japan, Shoji Ohta, Electrical Engineer, at 5–8–8, Nishifuna, Funabashi-shi, Chiba-ken, Japan, Yasutaka Iwawaki, Electrical Engineer, at 1–23–2, Ishikawa-cho, Ohta-ku, Tokyo, Japan and Yukio usui, Electrical Engineer, at 8–14–23, Sakurayama, Zushi-shi, Kanagawa-ken, Japan, in which the teaching materials reproduced are also reprinted on an endless auxiliary magnetic tape so that a student imitates the reprinted teaching materials which may be reproduced repeatedly and if necessary he may record his imitated speech or the like on the endless tape so as to compare it with the teaching materials. However, the length of each of the blocks of teaching materials varies while the length of the endless tape is fixed so that the teaching materials are reprinted only one portion of the endless tape or the leading portion of the teaching materials is erased when the block containing these teaching materials is too long to be recorded on the endless tape. That is, it is impossible to precisely reprint one block or section of teaching materials upon the whole length of the endless tape.

Therefore one of the objects of the present invention is to overcome the problems described above.

Another object of the present invention is to provide a device for use with a magnetic recording and reproducing apparatus for automatically varying the speed of magnetic recording medium in which the same information signals are recorded on at least two tracks of a magnetic recording medium in the same phase and the tape-speed control signals are recorded on the respective tracks in anti-phase with respect to each other so that the information signals may be derived as the summation signals while the control signals as the difference signals.

Another object of the present invention is to provide a device for use with a magnetic recording and reproducing apparatus for automatically varying the speed of magnetic recording medium in which the transport speed of an endless magnetic recording medium upon which the information signals on a master recording medium are reprinted is varied in response to the control signals recorded on the information signal recording tracks of the master recording medium which is transported at a constant speed so that the rotational speed of the endless magnetic recording medium, that is the apparent length thereof may be varied depending upon the length of the information signals to be reprinted.

Another object of the present invention is to provide a magnetic recording and reproducing apparatus especially adapted for learning in which upon an endless recording medium are reprinted the teaching materials which are divided into a plurality of sections or blocks having different lengths in recording upon a master magnetic recording medium upon which are also recorded the speed control signals ahead of each of the teaching material blocks or section so that the speed of the endless magnetic recording medium may be varied when the teaching materials are reprinted thereupon, whereby the teaching materials may be reprinted completely on the whole length of the endless recording medium or upon a predetermined length thereof.

SUMMARY OF THE INVENTION

In summary, the audio signals are recorded on the two tracks of the tape in phase and the control signals for automatically stopping the main tape and for varying the tapespeed of the endless tape are recorded on the respective tracks so as to be out of phase by 180°, so that the audio signals and the control signals may be derived independently as the summation and difference signals. Therefore the recording capacity of a magnetic tape may be nuch improved and the speed of the endless or auxiliary tape may be varied in response to the control signals. As the control signals, the audible signals are used so that they may be reproduced by the conventional tape recorders and separated from the audio signals. Therefore the automatic tape-speed varying device in accordance with the present invention is particularly advantageous for use with the universal type recorders.

The present invention will become more apparent from the following description of the preferred embodiment thereof taken in conjunction with the accompanying drawing.

DESCRIPTION OF THE PREFERRED EMBODIMENT

The present invention will be described as being applied to a magnetic recording and repreducing device especially adapted for learning (to be referred to as "A TAPE RECORDER" hereinafter for brevity) of the type disclosed in the above application Ser. No. 87,499.

Figures 1, 2A:
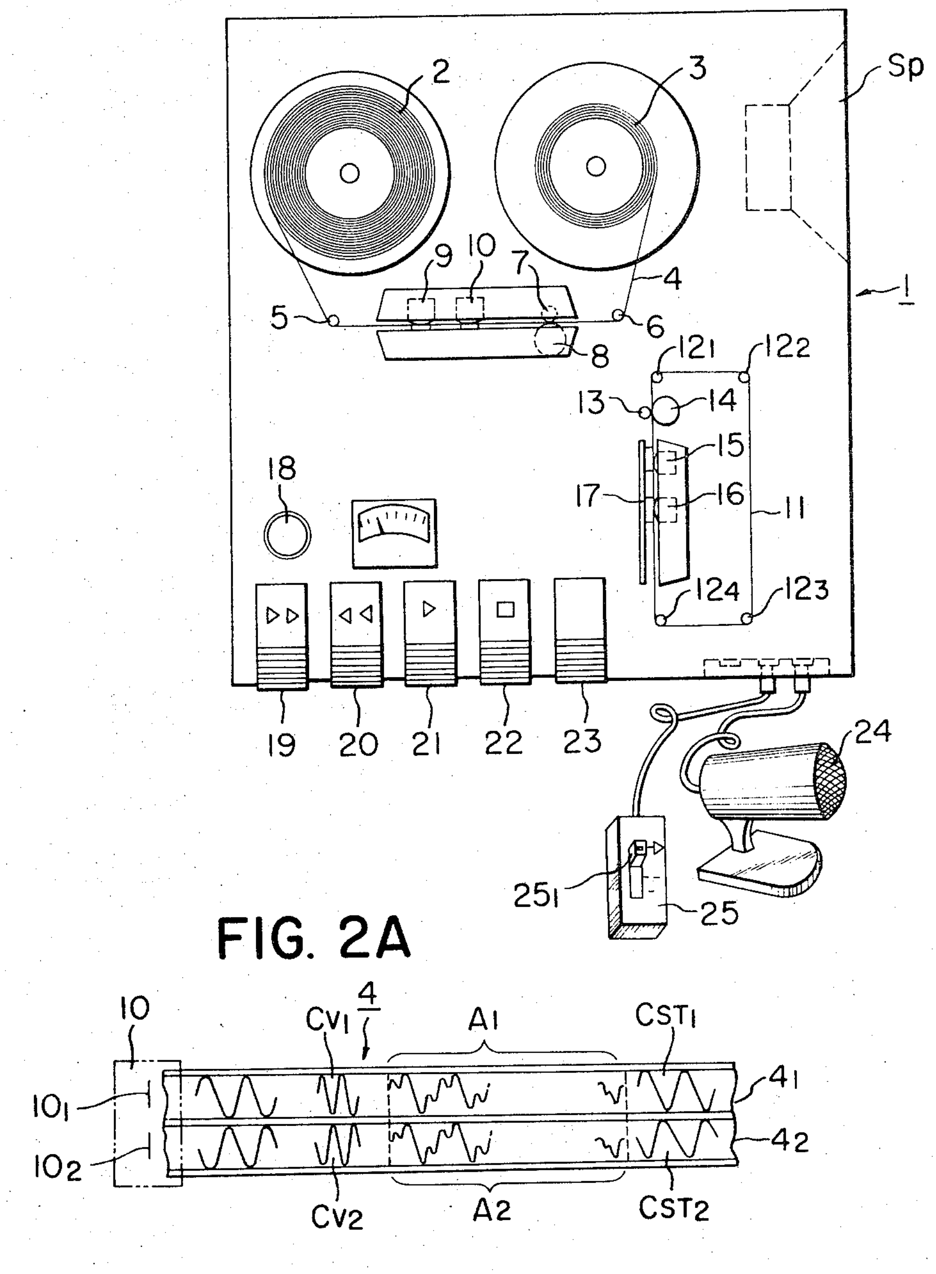
FIG. 1 is a schematic view of a magnetic recording and reproducing apparatus of the type especially adapted for learning and incorporating therein a device for automatically varying the speed of recording medium in accordance with the present invention.
FIGS. 2A and 2B are for explanation of magnetic tapes used by the apparatus shown in FIG. 1.
Figure 3:
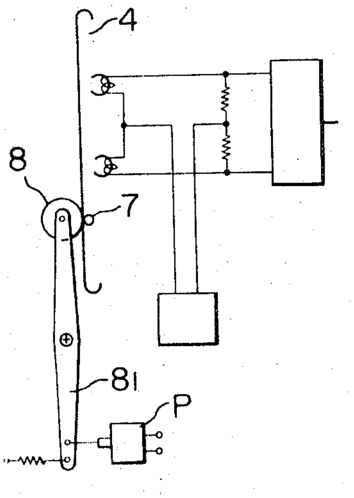
FIG. 3 is a diagrammatic view illustrating a device for temporarily stopping the teaching material tape.

Referring to FIG. 1, reference numeral 1 designates a main body or housing of the tape recorder; 2 and 3, a payoff and takeup reels respectively which are disposed upon the main body 1 and driven by a drive motor(not shown); 4, a magnetic tape recording thereupon the teaching materials in a manner to be described in more detail hereinafter; 5 and 6, tape guides; 7, a capstan; and 8, a pinch roller pressed against the capstan 7 through the tape 4 to transport the same in response to the depression of a playback button as will be described in more detail hereinafter. As shown in FIG. 3, one end of a pinch roller lever $8_1$ is pushed toward a plunger magnet P when it is energized so that the pinch roller 8 may be moved away from the capstan 8, thereby temporarily interrupting the transport of the magnetic tape 4. Reference numerals 9 and 10 designate a two-channel erase and record-playback magnetic heads respectively.

As best shown in FIG. 2A, the magnetic tape 4 has two tracks $4_1$ and $4_2$ upon which are recorded the same one sentence in foreign language as blocks $A_1$ and $A_2$ in the same phase respectively. Ahead of the blocks $A_1$ and $A_2$ in the respective tracks $4_1$ and $4_2$ are recorded tape-speed-control signals $C_{v1}$ and $C_{v2}$ in opposite or anti-phase and behind the blocks $A_1$ and $A_2$ on the respective tracks $4_1$ and $4_2$ are also recorded tape-stop signals $C_{st1}$ and $C_{st2}$ in anti-phase or opposite phase. The record-reproduce head 10 comprises in practice two heads $10_1$ and $10_2$ so as to reproduce the tracks $4_1$ and $4_2$ respectively of the tape 4.

The control signals $C_{v1}$ and $C_{v2}$ generally consist of the audible frequencies which are varied depending upon the lengths of the blocks of teaching materials to be reproduced after the control signals. In the instant embodiment, three frequencies are used; the first frequency $f_2$=120 Hz. the second frequency $f_3$=240 Hz. and the third frequency $f_4$=480 Hz. For example the frequency $f_2$ is used as the control signals for the blocks $A_1$ and $A_2$ because they reproduce the shorter sentences. As the stop signals $C_{st1}$ and $C_{st2}$ is used a sinusoidal wave of frequency $f_1$ different from those of the control signals $C_{v1}$. These control signals $f_1$–$f_4$ therefore have the audible frequencies in sinusoidal waveform.

Figure 2B:
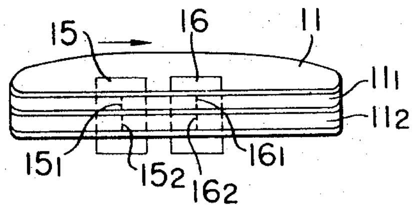

Referring back to FIG. 1, an endless tape 11 for practice is wrapped around four corner-guide rollers $12_1$–$12_4$ and is transported by a capstan 13 and a pinch roller 14 in the direction indicated by the arrow *a*. It is noted that the pinch roller 14 is normally pressed against the capstan 13 and the endless tape 11 is pressed against a record-reproduce head 15 and an erase head 16 by a tape pad 17. As best shown in FIG. 2B, the endless tape 11 has also two tracks $11_1$ and $11_2$ and the upper track $11_1$ is used to reprint the teaching materials from the tape 4 whereas the track $11_2$ is used to record and reproduce the sentence or speech practicised or imitated by a student. Each of the record-reprocuce and erase two-stacked heads comprise in practice two heads $15_1$ and $15_2$ and $16_1$ and $16_2$ for the respective tracks $11_1$ and $11_2$.

Still referring to FIG. 1, reference numerals 18, 19, 20, 21, 22 and 23 designate a record button, a forward button, a reverse button a playback button, a stop button and a repeat button respectively. These bottons except the repeat button 23 are for controlling the tape 4 through a mechanism (not shown) and when the repeat button 23 is depressed, only the endless tape 11 is transported. Reference numeral 24 designates a microphone whose control botton $25_1$ may be switched among the teaching material tape playback mode (▷), the endless tape playback mode position (Play) and the record mode position (REC) as will be described in more detail hereinafter. Since these pushbottons 18–23 and the mechanism coupled thereto for controlling the transport of the tape are widely used in the pushbutton type tape recorders and well known to those skilled in the art, no detailed description will be made in this specification. In brief, upon depression of the playback button 21, the motor (not shown) is driven to drive the capstan 7 to transport the tape 4 in unison with the pinch roller 8. Upon depression of the play button 21, a drive motor $M_2$ to be described hereinafter is energized to drive the capstan 13 to transport the endless tape 11 at a constant speed in unison with the pinch roller 14. That is, upon depression of the playback button 21, both of the tape 4 and the endless tape 11 are transported at predetermined constant speeds and the tape recorder is switched to the playback mode. The teaching materials recorded on the tape 4 are not only reproduced through the loudspeaker $S_p$ but also reprinted upon the endless tape 11.

When the playback button 21 is depressed simultaneously with a reproduce or playback button 18, the tape recorder is switched to the record mode so that the tape 4 is recorded through an input line (not shown).

Upon depression of the forward or reverse buttons 19 and 20, the pinch roller 8 is moved away from the capstan and the drive motor $M_1$ rotates either the reel 3 or 2 to thereby forward or reverse the tape 4 at high speed as is well known in the art. Upon depression of the repeat button 23, only the motor $M_2$ is energized to transport only the endless tape 11.

Figure 4:
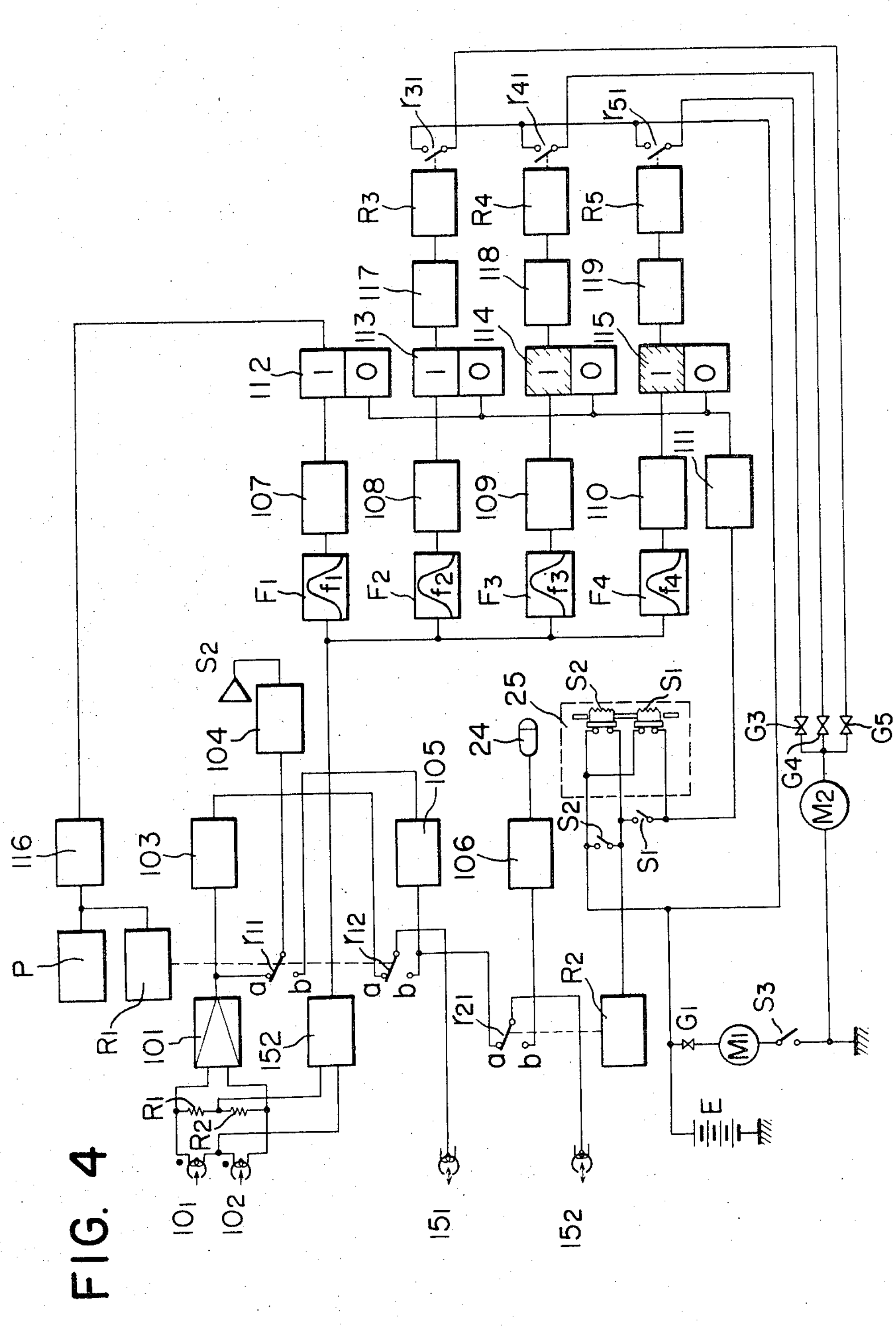
FIG. 4 is a block diagram of an electric circuit of the apparatus shown in FIG. 1.

Next referring to FIG. 4 illustrating the block diagram of the electric circuit of the tape recorder, the record-reproduce heads $10_1$ and $10_2$ are coupled in series to the input terminals of a pre-amplifier 101. A voltage divider consisting of two resistors $R_1$ and $R_2$ having the same value are connected across the input terminals of the pre-amplifier 101, and the junction between them and the heads $10_1$ and $10_2$ are coupled to the input terminals of a control signal amplifier 102.

Figure 5:
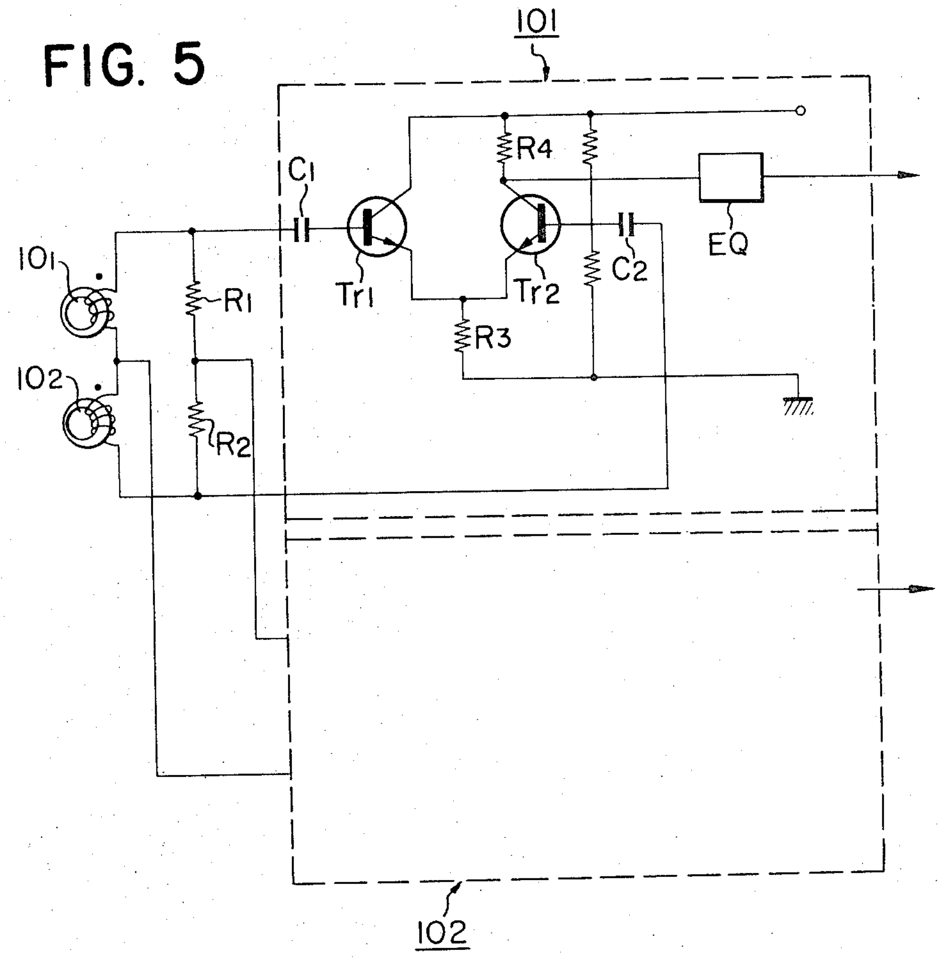
FIGS. 5 and 6 are circuit diagrams of the components incorporated in the block diagram shown in FIG. 4.

As shown in FIG. 5, the pre-amplifier 101 comprises a difference amplifier consisting of two transistors $Tr_1$ and $Tr_2$, and the coils of the heads $10_1$ and $10_2$ are wound in the same direction. The output of the head $10_1$ is applied to the base of the transistor $Tr_1$ through a coupling capacitor $C_1$ while the output of the head $10_2$ to the base of the transistor $Tr_2$ through a coupling capacitor $C_2$. Both of the emitters of the transistors $Tr_1$ and $Tr_2$ are coupled to a common emitter resistor $R_3$, and the difference output is derived across a load $R_4$ coupled to the transistor $Tr_2$. An equalizer EQ is provided to adjust the output of the difference amplifier, that is the collector output of the transistor $Tr_2$ to accomodate required output characteristics. The amplifier 102 is substantially similar to the pre-amplifier 101 except that the input terminals are coupled to the junctions between the heads $10_1$ and $10_2$ and the resistors $R_1$ and $R_2$.

The teaching material block $A_1$ and its control signals $Cv_1$ and $Cst_1$ on the track $4_1$ of the tape 4 are reproduced by the head $10_1$ while the teaching material block $A_2$ and is control signals $Cv_2$ and $Cst_2$ are reproduced by the head $10_2$, but the output signals are derived from the opposite ends of the coils of the heads $10_1$ and $10_2$ so that they are out of phase by 180°. From the difference amplifier 101, the difference between the outputs of the heads $10_1$ and $10_2$ is derived and applied to the equalizer EQ, so that the output of the difference amplifier is given by $$(A_1 + Cv_1 + Cst_1) + (A_2 + Cv_2 + Cst_2) =$$
$$(A_1 + A_2) + (Cv_1 + Cv_2) + (Cst_1 + Cst_2).$$

Since the control signals $Cv_1$ and $Cv_2$ and $Cst_1$ and $Cst_2$ are the same signals, but out of phase by 180° the control signals $Cv_1$ and $Cv_2$ and $Cst_1$ and $Cst_2$ are cancelled by each other. As a consequence only the summation of the audio signals $A_1$ and $A_2$ are derived from the amplifier 101. Since the audio signals are the same signals and are in phase, $A_1 + A_2 = 2A_1$.

The output signal of the head $10_2$ is applied to the amplifier 102 from the junction between the heads $10_1$ and $10_2$ and the output signal of the head $10_1$ is applied also to the amplifier 102 from the junction between the resistors $R_1$ and $R_2$ so that the output from the amplifier 102 is given by $$(A_1 + Cv_1 + Cst_1) - (A_2 + Cv_2 + Cst_2) =$$
$$(A_1 - A_2) + (Cv_1 - Cv_2) + (Cst_1 - Cst_2).$$

Since the audio signals $A_1$ and $A_2$ are in phase, they are cancelled by each other so that the audio signal output becomes zero. However, the control signal are out of phase by 180° so that the outputs of the control signals become $$(Cv_1 - Cv_2) = 2Cv_1, \text{ and}$$
$$(Cst_1 - Cst_2) = 2Cst_1.$$

Referring to FIG. 4, reference chafacters $r_{11}$ and $r_{12}$ designate movable contacts of a relay $R_1$ to be described hereinafter, and they are made in contact with the fixed contacts *a* when the relay $R_1$ is de-energized, but is made in contact with the fixed contacts *b* when the relay $R_1$ is energized. The input terminal of a reprint amplifier 103 is coupled to the output terminal of the pre-amplifier 101 so that the bias current is superposed upon the output from the pre-amplifier 101. The input terminal of a power amplifier 104 is coupled to the movable contact $r_{11}$ whereas the output terminal thereof is coupled to the loudspeaker $S_p$. The input terminal of a playback preamplifier 105 is coupled to the fixed contact *b* of the movable contact $r_{12}$ whereas its output terminal to the fixed contact *b* of the movable contact $r_{11}$. The input terminal of a record amplifier 106 is coupled to the microphone 24 so as to amplify the output from the microphone and superpose the base current upon the amplified output. Band-pass filters $F_1 - F_4$ are coupled in parallel and connected to the output terminal of the control signal amplifier 102 so as to pass the frequencies $f_1 - f_4$ described above respectively. The output terminals of these filters $F_1 - F_4$ are coupled to waveform reshaping circuits 107, 108, 109 and 110 respectively whose output terminals in turn are coupled "1" set terminals of flip-flops 112–115 respectively.

Figure 6:
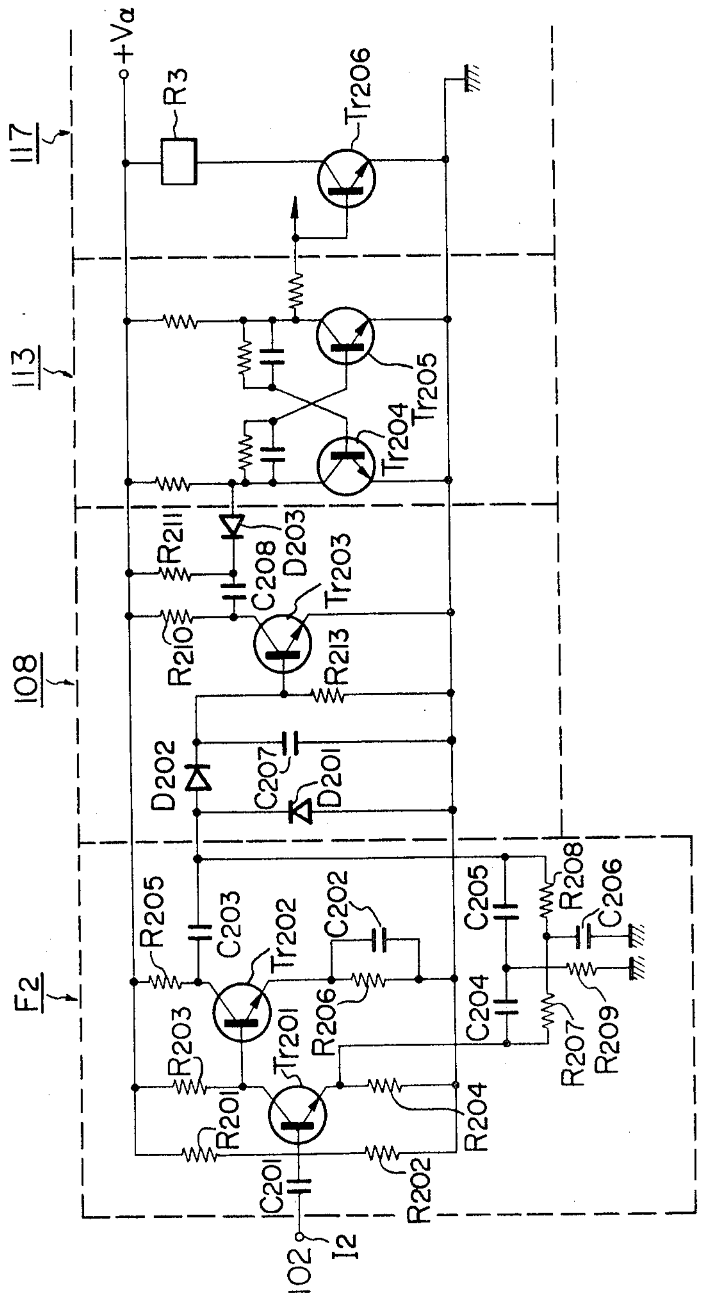

The interconnections among the filters $F_1 - F_4$, the waveform reshaping circuits 107–110, the flip-flops 112–115, the relay drive circuits 117–119 and relays $R_3$–$R_5$ are similar so that only one typical interconnection will be described with reference to FIG. 6 illustrating the interconnection among the filter $F_2$, the waveform reshaping circuit 108, the flip-flop 113, the relay drive circuit 117 and the relay $R_3$. The input terminal $I_2$ of the filter $F_2$ is coupled to the output terminal of the amplifier 102. Reference character $C_{201}$ designates a coupling capacitor; $R_{201}$, $R_{020}$ and $R_{204}$, bias resistors of an npn type transistor $Tr_{201}$; $R_{203}$, a load resistor thereof; $Tr_{202}$, an npn type transistor cascade-connected to the transistor $Tr_{201}$; $R_{205}$, a load resistor of the transistor $Tr_{202}$; $R_{206}$, a bias resistor; $C_{202}$, a bypass capacitor; and $C_{203}$, a coupling capacitor.

A T-type network comprising capacitors $C_{205}$ and $C_{206}$, resistors $R_{207}$ and $R_{208}$ and a capacitor $C_{206}$ is connected in parallel with the feedback path from the transistor $Tr_{202}$ to the transistor $Tr_{201}$. This network is called a twin-T rejection network the impedance of each element of which is so selected to stop the specified frequency $f_2$ which passes the filter $F_2$.

In the reshaping circuit 108 $D_{201}$ and $D_{202}$ denote rectifier diodes; $C_{207}$, a charging capacitor; $R_{213}$, a discharging resistor; $R_{210}$, a load resistor of npn type transistor $Tr_{203}$; $C_{208}$, a capacitor which forms a differentiating circuit together with a resistor $R_{211}$; and $D_{203}$, a rectifier diode. The reshaping circuit 108 comprising these elements rectifies the output of $f_2$ from the filter $F_2$ by its rectifier diodes $D_{201}$ and $D_{202}$ to charge the capacitor $C_{207}$, thereby conducting the transistor $Tr_{203}$. The output of the transistor $Tr_{203}$ is differentiated by the differentiating circuit $R_{211}$ and $C_{208}$ and applied to the flip-flop 113.

The flip-flop 113 is a conventional flip-flop comprising transistors $Tr_{204}$ and $Tr_{205}$, and the collector of the transistor $Tr_{204}$ is coupled to the diode $D_{203}$.

The relay drive circuit 117 comprises a switching transistor $Tr_{206}$ whose base is coupled to the collector of the transistor $Tr_{205}$ in the flip-flop 113.

A relay $R_3$ is inserted between the collector of the switching transistor $Tr_{206}$ and that of the transistor $Tr_{205}$.

In response to the output of the frequency $f_2$ from the amplifier 102, the twin-T network in the filter $F_2$ consisting of the T-type phase advancing network of the capacitors $C_{204}$ and $C_{205}$ and the resistor $R_{208}$ and the T-type phase lagging network of the resistors $R_{207}$ and $R_{208}$ and the capacitor $C_{206}$ interrupts the negative feedback path from the collector of the transistor $Tr_{202}$ to the emitter of the transistor $Tr_{201}$ in the filter circuit $F_2$. As a consequence the amplification degree attained by the transistors $Tr_{201}$ and $Tr_{202}$ in the filter $F_2$ is increased, and the output of the filter $F_2$ is rectified by the diode $D_{202}$ and is charged across the capacitor $C_{207}$, thereby conducting the transistor $Tr_{203}$ in the waveform reshaping circuit 108. The output of the transistor $Tr_{203}$ is differentiated by the differentiating circuit $R_{211}$ and the capacitor $C_{203}$ and is rectified by the diode D $_{203}$, thereby reversing the flip-flop 113, that is conducting the transistor $Tr_{204}$ while turning off the transistor $Tr_{205}$. Therefore the switching transistor $Tr_{206}$ in the relay drive circuit 117 is turned on, thereby energizing the relay $R_3$. In summary, the relay $R_3$ is energized by the output of the frequency $f_2$ from the amplifier 102 through the filter $F_2$, the reshaping circuit 108, the flip-flop 113 and the relay drive circuit 117. Similarly in response to the outputs of frequencies $f_1$, $f_3$ and $f_4$ from the amplifier 102, the plunger P and the relays $R_4$ and $R_5$ are energized respecrively.

The twin-T filter networks employed in the filters are well known to those skilled in the art so that the detailed description will not be made, and it is understood that the component elements and impedances in the twin-T filter networks are so selected that the filters $F_1$, $F_3$ and $F_4$ may have the narrow-bank-stop characteristics to stop the frequencies $f_1$, $f_3$ and $f_4$ respectively.

Reference character $S_1$ denotes a normally open contact which is closed when the button $25_1$ of the remote switch 25 is switched to the tape playback position ( ⊳ ); and $S_1'$, a contact which is closed upon depression of the playback button 21. Both of the contacts $S_1$ and $S_1'$ are connected to the DC source E and to the "0" set terminals of the flip-flops 112, 113, 114 and 115 through a waveform reshaping circuit 111. The "1" output terminals of the flip-flops 112–115 are connected to the relay drive circuits 116, 117, 118 and 119 to energize the relays $R_1$, $R_3$, $R_4$ and $R_5$ respectively as described hereinafter with reference to the relay $R_3$.

Contacts $r_{31}$, $r_{41}$ and $r_{51}$ of the relays $R_3$, $R_4$ and $R_5$ are coupled through governor contacts $G_3$, $G_4$ and $G_5$ to the motor $M_2$ for driving the capstan 13 so as to transport the endless tape 11. The rotational speeds of the motor $M_2$ are selected by the governor contacts $G_3$, $G_4$ and $G_5$ so as to transport the endless tape 11 at speeds $V_1$, $V_2$ and $V_3$. In the instant embodiment, these tape speeds has the following relation:

$V_1 > V_2 > V_3$.

The capstan 7 is driven by the motor $M_1$ to transport the teaching material tape 4. Reference character $G_1$ denotes the governor contact of the motor $M_1$; $S_2$, a contact which is closed when the button $25_1$ of the remote switch 25 is switched to the recording mode position (REC); $S_2'$, a normally open contact which is closed when the repeat button 28 is depressed; and $S_3$, a contact which is closed upon depression of the playback button 21. The governors $G_1 - G_5$ are carried by the shafts of the motors $M_1$ and $M_2$ respectively so as to be opened and closed under the centrifugal force. They may be the mechanical governors which are well known to those skilled in the art so that no detailed description thereof will be made in this specification.

Next the mode of operation of the tape recorder of the type described will be described. When the remote switch 25 is switched to the teaching material tape playback mode position ( ⊳) and the playback button 21 is depressed, the contact $S_1$ is closed so that the "0" set signal is applied to the "0" set input terminals of the flip-flops 112–115, whereby they are set to "0." Simultaneously the contact $S_3$ is closed to drive the motor $M_1$ to rotate the capstan 7 so that the tape 4 is transported at a constant speed.

When the tape-speed-control signals $Cv_1$ and $Cv_2$ ahead of the teaching material blocks $A_1$ and $A_2$ are reproduced by the heads $\mathbf{10}_1$ and $\mathbf{10}_2$, the difference component is applied to the input terminal of the control signal amplifier 102 while the summation component is applied to the amplifier 101. The output from the amplifier 102 is applied to the filters $F_1 - F_4$ and only the filter $F_2$ outputs the signal because the control signals $Cv_1$ and $Cv_2$ are the sinusoidal signals of the frequency $f_2$ as described above. The output of the filter $F_2$ is applied through the reshaping circuit 107 to the "1" set input terminal of the flip-flop 112 to thereby set it to "1." As a consequence the relay $R_3$ is energized to close the contact $r_{31}$ and the current is supplied to the motor $M_2$ by the circuit $E \rightarrow r_{31} \rightarrow G_3 \rightarrow E$ so that the motor $M_2$ starts to rotate at a rotational speed controlled by the governor contact $G_3$. Therefore the endless tape 11 is transported at the high speed $V_1$.

The audio signals recorded on the blocks $A_1$ and $A_2$ are in phase so that the summation signal component is applied to the pre-amplifier 101. The output from the preamplifier 101 is applied through the contact $r_{11}$ to the power amplifier 104 to be reproduced by the loudspeaker $S_p$. Simultaneously the output from the amplifier 101 is also applied through the contact $r_{12}$ and the record amplifier 103 to the head $\mathbf{15}_1$ to reprint the teaching materials $A_1$ and $A_2$ on the track $\mathbf{11}_1$ of the endless tape 11.

The governor contact $G_3$ controls the tape speed $V_1$ of the endless tape 11 so that it may transported by a half length thereof when the teaching materials $A_1$ and $A_2$ have been reprinted.

The summation of the control signals $Cst_1$ and $Cst_2$ reproduced by the heads $\mathbf{10}_1$ and $\mathbf{10}_2$ are zero so that the difference signal is applied to the amplifier 102. Therefore, in response to the output of frequency $f_1$ from the amplifier 102, the relay $R_1$ is energized through the filter $F_1$, the flip-flop 112 and the relay drive circuit 116 so that both of the movable contacts $r_{11}$ and $r_{12}$ are switched to the fixed contacts *b*. As a consequence the plunger electromagnet P (See FIG. 3) is energized to move the pinch roller 8 away from the capstan 7 thereby temporarily stopping the tape 4.

The endless tape 11 continues to travel at the speed $V_1$, and when the endless tape 11 makes on rotation, the reprinted teaching materials may be reproduced through the head $\mathbf{15}_1$, the contact $V_{12}$ (b), the amplifier 105, the contact $V_{11}$ (b), the power amplifier 104 and the loudspeaker $S_p$. After the student listens the reproduced teaching materials, he switches the button $\mathbf{25}_1$ to the record mode position(REC) and imitates the teaching materials he heard before the microphone 24 so that his speech may be recorded upon the lower track $\mathbf{11}_2$ of the endless tape 11 through the microphone 24, the record amplifier 106, the contact $r_{21}$ (b) and the head $\mathbf{15}_2$. Since the teaching materials are recorded upon the first half of the track $\mathbf{11}_1$ as described above, the endless tape 11 makes one rotation when the student's speech was recorded on the track $\mathbf{11}_2$.

When the button $\mathbf{25}_1$ is switched to the play mode position, the reprinted teaching materials and his speech are reproduced through the circuit

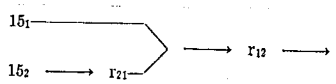

the playback pre-amplifier 105 → $r_{11}$ → the power amplifier 104 → the loudspeaker $S_p$. Therefore, the student compares his speech or imitation with the reproduced teaching materials. When the student thinks his practice is not sufficient judging from this comparison, he switches the button $25_1$ of the remote switch 25 to the record mode position (REC) again so that he may record his speech again on the track $11_2$. Thereafter, he switches the button $25_1$ to the play mode position to compare his speech with the teaching materials reproduced from the track $11_1$. Therefore it is seen that the student repeats his practice of the same teaching materials as many times as he wishes only by operating the button $25_1$ of the remote switch 25.

According to the present invention, the speed of the endless tape is varied in response to the tape-speed control signal recorded ahead of the blocks of teaching materials as well as student's imitation may be recorded within the length of the endless tape 11 without leaving any interval between the reprinted teaching materials and the student's speech recorded. Therefore the practice may be repeated in an efficient manner.

As described hereinabove, according to the present invention, the audio signals are recorded on the two tracks of the tape in phase and the control signals for automatically stopping the main tape and for varying the tape-speed of the endless tape are recorded on the respective tracks so as to be out of phase by 180°, so that the audio signals and the control signals may be derived independently as the summation and difference signals. Therefore the recording capacity of a magnetic tape may be much improved and the speed of the endless or auxiliary tape may be varied in response to the control signals. As the control signals, the audible signals are used so that they may be reproduced by the conventional tape recorders and separated from the audio signals. Therefore the automatic tape-speed varying device in accordance with the present invention is particularly advantageous for use with the universal type tape recorders.

Figure 7:
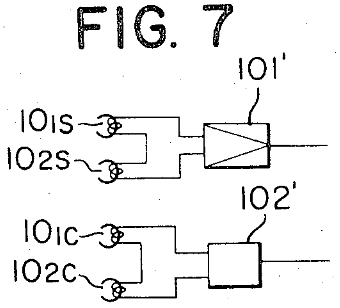
FIG. 7 is a diagrammatic view illustrating a variation of magnetic heads used in the present invention.

The present invention has been described as being applied to a tape recorder for learning and the audio signals and the tape-speed control signals are reproduced by the same heads, but different heads may be employed. That is, as shown in FIG. 7, the audio signals recorded on the tracks $4_1$ and $4_2$ are reproduced by the heads $10_{13}$ and $10_{23}$ whose coils are wound in the same direction and the control signals are reproduced by the heads $10_{1c}$ and $10_{2c}$ whose coils are wound in the opposite directions from each other and which are disposed in side-by-side relation with respect to the heads $10_{13}$ and $10_{23}$. The control signals have been described as having sinusoidal waveforms and being recorded in anti-phase on the respective track, but it is understood that the controls signals may be pulses or may have the sawtooth waveforms which are recorded in the respective tracks in opposite phase with respect to each other. In this case, a number of pulses recorded may represent the control signals.

According to the present invention, the tape speed of the endless tape may be varied automatically depending upon the length of the blocks of teaching materials recorded on the tape so that the problem of double recording may be eliminated and the teaching materials and the practice may be recorded on the whole length of the endless tape without leaving any time interval therebetween. Therefore, the student may practice in an efficient manner without waiting a long time before the practice or teaching materials are reproduced after the teaching materials or practice is reproduced.

We claim:

1. A device for use with a magnetic recording and reproducing apparatus for automatically controlling the speed of magnetic recording medium comprising first driving means for driving a first magnetic recording medium at a predetermined speed, said first magnetic recording medium having at least two recording tracks upon which the information signal is recorded in the same phase, and upon which the speed control signals are recorded in opposed phase, said speed control signals being of specified different frequencies representing several different speeds being recorded before said information signal in the direction of advance of said magnetic medium when reproducing the information signal;

reproducing means for reproducing said information signal and said speed control signals recorded on said two tracks of said first recording medium, said reproducing means reproducing said speed control signals recorded in opposed phase by subtracting one from the other and reproducing said information by adding the information recorded in one track to the information recorded on the other track;

second driving means for driving a second magnetic recording medium consisting of an endless tape at several different speeds, speed control signal discrimination means coupled to said reproducing means for receiving the speed control signals reproduced by said reproducing means, said speed control means being coupled to said second driving means for driving said second magnetic recording medium at a controlled speed in response to said speed control signals reproduced, whereby said second magnetic recording medium may be transported at a speed controlled in response to said speed control signals recorded on said first magnetic recording medium.

2. A device for use with a magnetic recording and reproducing apparatus for automatically controlling the speed of magnetic recording medium as specified in claim 1 wherein said reproducing means comprises a pair of magnetic heads which are disposed in opposed relation with said first recording medium and whose coils are wound in the same direction around the cores of said heads and connected in series, a pair of impedance elements connected in parallel with said two heads, and an amplifier whose input terminals are connected to the junctions between said two heads and between said pair of impedance elements.

3. A device for use with a magnetic recording and reproducing apparatus for automatically controlling the speed of magnetic recording medium as specified in claim 1 wherein said speed control signal discrimination means comprises at least two filters which pass specified different frequencies respectively, and switching members actuated by the outputs from said filters, and said second driving means comprises a drive motor having at least two speed control governors so as to selectively maintain the rotational speeds of said drive motor at one of at least two different predetermined speeds, said governors being connected through said switching member to a power source and to said drive motor, whereby said switching members are selectively actuated in response to the frequencies of said speed control signals recorded on said first magnetic recording medium so as to selectively insert said governors between said drive motor and said power source.

4. A device for use with a magnetic recording and reproducing apparatus for automatically controlling the speed of magnetic recording medium as specified in claim 1 wherein said reproducing means includes means for reprinting the reproduced information upon said second magnetic recording medium

5. A device for use with a magnetic recording and reproducing apparatus for automatically controlling the speed of magnetic recording medium as specified in claim 4 wherein said speed control signal discrimination means includes at least two memory circuits having two states to be reversed in response to said speed control signals, and switching members coupled to said memory circuits so as to be actuated when said memory circuits are switched from one state to the other, and said second driving means includes a drive motor which has at least two speed control governors so as to selectively maintain the rotational speed of said drive motor at one of at least two predetermined different speeds, each of said speed governors being connected through said switching members to said motor and a power source.

6. A device for use with a magnetic recording and reproducing apparatus for automatically controlling the speed of magnetic recording medium as specified in claim 1 wherein said reproducing means includes a first pair of magnetic reproduce heads which are disposed in opposed relation with said first magnetic recording medium and whose coils are wound in the opposite directions with respect to each other and a second pair of magnetic reproduce heads whose coils are wound in the same direction, whereby said first pair of magnetic reproduce heads reproduce said speed control signals while said second pair of magnetic reproduce heads reproduce said information.

7. A device for use with a magnetic recording and reproducing apparatus for automatically controlling the speed of magnetic recording medium as specified in claim 6 wherein said speed control signal discrimination means includes at least two filters which pass specified different frequencies respectively and coupled to said memory circuits respectively, whereby one of said filters selectively outputs in response to the difference between the frequency components of said speed control signals so as to cause one of said memory circuits to change from one state to the other.

8. A device for use with a magnetic recording and reproducing apparatus for automatically varying the speed of magnetic recording medium as specified in claim 6 wherein said memory circuits are reset in response to the energization of said first driving means.

9. A device for use with a magnetic recording and reproducing apparatus for automatically varying the speed of magnetic recording medium as specified in claim 6 wherein said memory circuits comprise flip-flops.

* * * * *